UNITED STATES PATENT OFFICE.

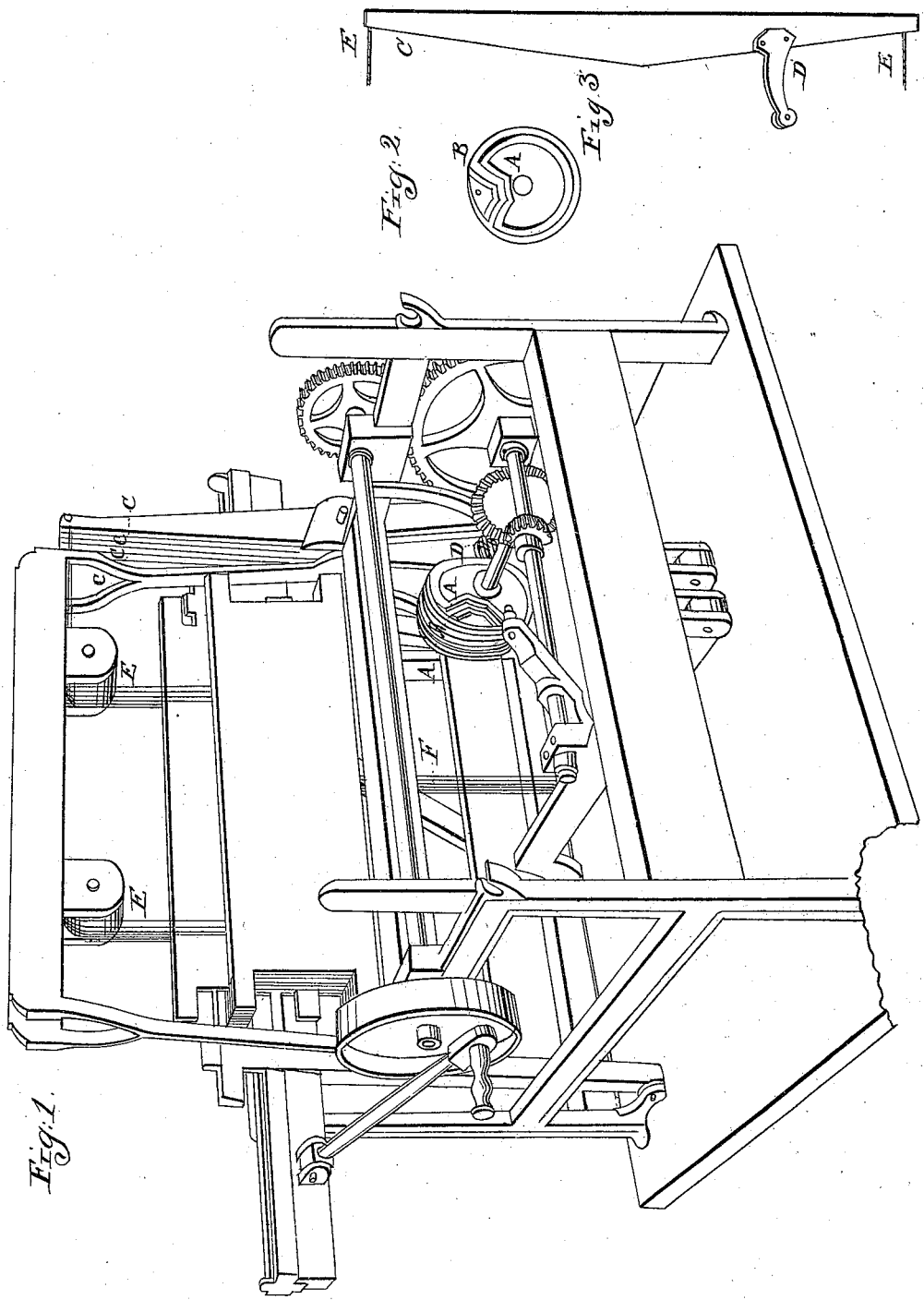

ELI HORTON, OF STAFFORD, CONNECTICUT.

MODE OF OPERATING THE TREADLES IN POWER-LOOMS.

Specification of Letters Patent No. 617, dated February 22, 1838.

*To all whom it may concern:*

Be it known that I, ELI HORTON, of the town of Stafford, in the county of Tolland and State of Connecticut, have invented a new and useful Improvement in Looms, being an improved method of working the chains or harness by wheels with eccentric grooves and levers instead of treadles and weights or cams and levers, which improvement is described as follows, reference being had to the annexed drawings of the same, making part of this specification.

The loom is constructed and operated generally like other looms in use, except that the chains or harness are raised and depressed by means of eccentric grooved wheels and levers in the manner hereafter described.

Figure 1, represents a perspective view of part of the looms showing the position of the eccentric grooved wheels and levers.

A A A A are the wheels with eccentric grooves—each wheel having two eccentric grooves—one on each side of the wheel for vibrating the levers: said wheels are fixed on a horizontal shaft turning in boxes in the frame, by any suitable gearing; such as is represented in the drawings, if preferred. B, the eccentric grooves on the sides of said wheels.

C, C, C, C, C, C the levers or treadles to which the chain or harness-cords are attached, moving on a horizontal rod or bolt passed through ears or projections from the loom-frame—said rod or bolt being the fulcrum of each lever.

D, D D D D D arms fastened to the levers—at right angles and from the sides of which project studs or pins on which are placed anti-friction rollers that fall into the eccentric grooves of the wheels as they revolve for moving the levers.

E cords attached to the upper ends of the levers or treadles and passing horizontally from thence to pulleys over which they pass and extend downward to the harness or chains to which they are fastened for raising them.

F, cords for drawing down the chains or harness fastened to the lower ends of the levers and extended horizontally under pulleys and then vertically to the chains or harness to which they are fastened.

Fig. 2 represents the other side of the same wheels showing the other groove on said wheel.

Fig. 3 represents one of the levers, arms, and anti-friction roller.

Operation: The loom being put in motion the shafts on which the grooved wheels are fastened is turned by the gearing before referred to—the roller of treadle No. 1 takes into groove No. 1 on the side of wheel No. 1 and follows its undulation causing said treadle to vibrate backward and forward which first raises and then draws down the harness attached thereto and before it leaves said groove the roller of treadle No. 4 takes into groove No. 4 on the side of wheel No. 2 and vibrates treadle No. 4 raising and drawing down the harness attached thereto and before said roller leaves groove No. 4 the roller of treadle No. 2 takes into groove No. 2, on the other side of wheel No. 1, and causes said treadle No. 2, to perform its office on the harness attached thereto—the roller of treadle No. 5, takes into groove No. 5 of wheel No. 3 and performs a similar operation on treadle No. 5—and before said roller leaves its groove the roller of treadle No. 3 takes into the groove on the side of wheel No. 2 and performs its office—and lastly before said roller No. 3 leaves its groove the roller of treadle No. 6 takes into the 6th groove on the side of wheel No. 3, and causes said treadle to vibrate and raise and then drawn down the harness attached thereto, thus vibrating the several treadles and moving the sets of harness attached thereto—in succession—the wheels performing one revolution in working the six treadles.

The above operation relates to a loom for weaving satinet; but for weaving other kinds of cloths the number of treadles and grooves must be varied accordingly.

As the anti-friction rollers of the treadles enter the groove it causes the upper ends of them to recede from the harness—drawing said harness up and that as the rollers leave the grooves it causes the lower ends of the treadles to recede and draw down the harness.

The invention claimed by me the said ELI HORTON and which I desire to secure by Letters Patent consists in—

The construction and arrangement of the single set of wheels with eccentric grooves for vibrating the levers or treadles for raising and drawing down the harness of the loom as before described, or in any other mode substantially the same in principle.

ELI HORTON.

Witnesses:
WM. P. ELLIOT,
WM. BISHOP.